(12) United States Patent
Yi et al.

(10) Patent No.: US 11,714,330 B2
(45) Date of Patent: Aug. 1, 2023

(54) PHASE-COMBINING WAVEGUIDE DOUBLER FOR OPTICAL PHASED ARRAY IN SOLID-STATE LIDAR APPLICATIONS

(71) Applicant: THE REGENTS OF THE UNIVERSITY OF MICHIGAN, Ann Arbor, MI (US)

(72) Inventors: Ya Sha Yi, Troy, MI (US); Da Chuan Wu, Dearborn, MI (US)

(73) Assignee: THE REGENTS OF THE UNIVERSITY OF MICHIGAN, Ann Arbor, MI (US)

( * ) Notice: Subject to any disclaimer, the term of this patent is extended or adjusted under 35 U.S.C. 154(b) by 0 days.

(21) Appl. No.: 17/730,930

(22) Filed: Apr. 27, 2022

(65) Prior Publication Data

US 2022/0357632 A1 Nov. 10, 2022

Related U.S. Application Data (60) Provisional application No. 63/182,314, filed on Apr. 30, 2021.

(51) Int. Cl.
*G02F 1/313* (2006.01)
*G02F 1/29* (2006.01)
*G01S 7/481* (2006.01)

(52) U.S. Cl.
CPC ............ *G02F 1/3137* (2013.01); *G02F 1/292* (2013.01); *G01S 7/4817* (2013.01)

(58) Field of Classification Search
CPC .................................................. G02B 6/29355
See application file for complete search history.

(56) References Cited

U.S. PATENT DOCUMENTS 10,678,117 B2 *  6/2020  Shin ...................... G01S 7/4813
11,320,717 B2 *  5/2022  Zhu ......................... G01S 17/89
(Continued)

FOREIGN PATENT DOCUMENTS

EP          2419964 B1       7/2020
KR    10-2019-0086279 A      7/2019
WO       2020164171 A1       8/2020

OTHER PUBLICATIONS

D. Wu and Y. Yi, "High efficiency end-fire 3-D optical phased array based on multi-layers SiN/SiO platform," 2021 IEEE Photonics Society Summer Topicals Meeting Series (SUM), Cabo San Lucas, Mexico, 2021, pp. 1-2, doi: 10.1109/SUM48717.2021.9505943. (Year: 2021).*

(Continued)

*Primary Examiner* — Rhonda S Peace
(74) *Attorney, Agent, or Firm* — Harness, Dickey & Pierce, P.L.C.

(57) ABSTRACT

Integrated Optical Phased Array device is a good potential solution for the solid-state LIDAR technology in the application of autonomous driving technique. However, some difficulties still limit the development of OPA devices, one of them is the conflict between the requirement of fewer units in the phase-tuning system and more elements in the emitting system. The present disclosure provides an approach of a Phase-Combining Waveguide Doubler (PCWD) to address this issue. This device can double the waveguide number without any phase mismatch. It enables the capability to control 2N−1 emitting elements with N phase shifters. The device is competitive to any grating coupler array based or end-fire based emitting method, which can potentially satisfy the requirement of a subwavelength pitch.

3 Claims, 5 Drawing Sheets

(56) References Cited

U.S. PATENT DOCUMENTS

2018/0074384 A1    3/2018  Eldada
2021/0116551 A1    4/2021  Lin
2022/0357632 A1*   11/2022 Yi ........................... G02F 1/292

OTHER PUBLICATIONS

S. Chung, H. Abediasl and H. Hashemi, "A Monolithically Integrated Large-Scale Optical Phased Array in Silicon-on-Insulator CMOS," in IEEE Journal of Solid-State Circuits, vol. 53, No. 1, pp. 275-296, Jan. 2018, doi: 10.1109/JSSC.2017.2757009. (Year: 2018).*
C. -S. Im et al., "Hybrid Integrated Silicon Nitride—Polymer Optical Phased Array For Efficient Light Detection and Ranging," in Journal of Lightwave Technology, vol. 39, No. 13, pp. 4402-4409, Jul. 1, 2021, doi: 10.1109/JLT.2021.3070386. (Year: 2021).*
International Search Report and Written Opinion regarding Patent Application No. PCT/US2022/026796, dated Aug. 23, 2022.

\* cited by examiner

PHASE-COMBINING WAVEGUIDE DOUBLER FOR OPTICAL PHASED ARRAY IN SOLID-STATE LIDAR APPLICATIONS

CROSS-REFERENCE TO RELATED APPLICATIONS

This application claims the benefit of U.S. Provisional Application No. 63/182,314, filed on Apr. 30, 2021. The entire disclosure of the above application is incorporated herein by reference.

FIELD

The present disclosure relates to optical phased arrays and, more particularly, relates to a phase-combining waveguide doubler (PCWD) for optical phased array in solid-state LIDAR applications.

BACKGROUND AND SUMMARY

This section provides background information related to the present disclosure which is not necessarily prior art. This section provides a general summary of the disclosure, and is not a comprehensive disclosure of its full scope or all of its features.

With the development of autonomous driving technology, many companies in the automotive industry have turned their focus to LIDAR (light detection and ranging). Compared to traditional radar, LIDAR can provide a more precise 3-D image within a sufficiently long range that enables systems to distinguish humans at a typical braking distance (e.g., 200 m).

In most cases, the optical part of a LIDAR system comprises three parts, including a light source, a light steering device, and a light detector. Traditional LIDAR typically rotates the entire device body to steer the light beam. However, such mechanical methods result in disadvantages, such as high cost, relatively low steering speed, large body size, and relatively low reliability. These disadvantages are overcome by the solid-state beam steering systems and methods of the present teachings.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIGS. 4A-C show a simulation result for three devices with $\varphi_{different}$ range of [0°, 90°], wherein FIG. 4A is for PCWD Device, 6 input and 11 output; FIG. 4B is for no PCWD Device, 11 input and 11 output, and FIG. 4C is for no PCWD Device, 6 input and 6 output. The data were normalized as in FIG. 3.

Corresponding reference numerals indicate corresponding parts throughout the several views of the drawings.

DETAILED DESCRIPTION

Example embodiments will now be described more fully with reference to the accompanying drawings.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

Solid-state LIDAR products have appeared in the market having various steering mechanisms based on micro-electromechanical systems (MEMS) and a Flash method, but are limited in performance and application. Although attempts have tried, due to design and fabrication difficulties, there has not been a sufficiently mature and mass producible product in the market. In contrast, the integrated optical phased array (OPA) device of the present teachings shows great potential to overcome the limitations of the prior art—in some embodiments, the present teachings employ a solid-state solution or system compared to MEMS and offer a longer detection range (on the level of 200 m) compared to the Flash method. Additionally, in some embodiments, the present teachings offer a field of view (FOV) of nearly 180°, fast steering speed, fine resolution, and a potentially lower cost.

Figure 1:
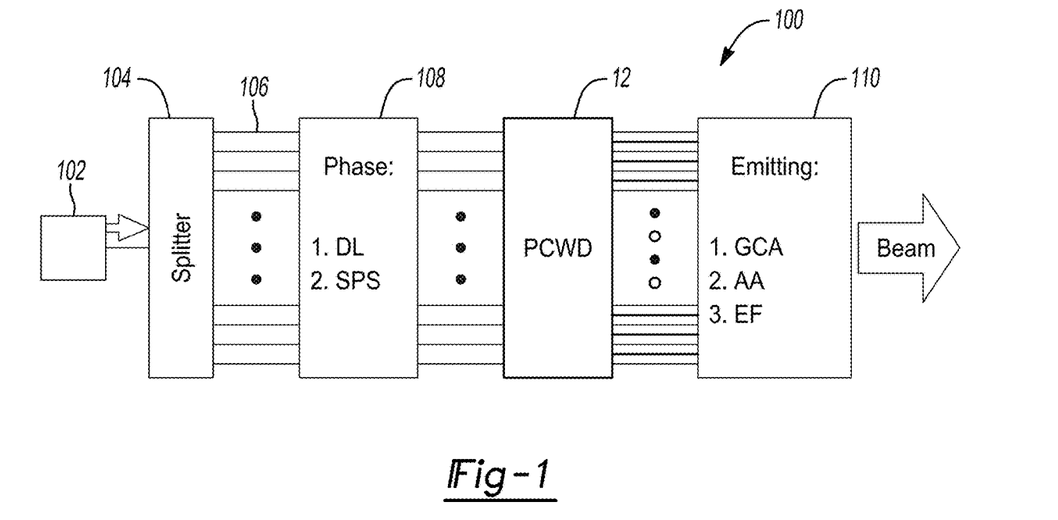
FIG. 1 is an illustration of an integrated OPA based solid-state beam steering device.

According to the present teachings, a phase combining waveguide 106 doubler (PCWD 12) for an optical phased array in solid-state LIDAR applications is provided to enable the control of 2N−1 emitting elements using N phase shifters. The present can satisfy any phase tuning method and most emitting methods and the associated structure is not limited to material or other detailed structure size, and is thus compatible with nearly every OPA based beam steering device With reference to the figures, an OPA-based beam steering devices for LIDAR have been conceived. Generally, as illustrated in FIG. 1, an OPA-based beam steering device 100 can comprise a single light source 102 having a wavelength usually at NIR (near-infrared) range. The output of light source 102 is input to a splitter 104 to separate the light energy into multiple waveguides 106 106—either a star-coupler or a Y-splitter tree can be used.

After the even distribution of energy from the light source 102 into each waveguide 106, the energy enters into a phase-tuning system 108. One simple approach to tune the phase is to utilize dispersive effect, by designing suitable delay lines in different waveguides 106, the phase can be tuned into different results when applying different wavelength. A U-shape delay line region is utilized to obtain suitable dispersive phase tuning result. This principle is further developed to obtain an additional advantage of large aperture. In some embodiments, a phase shifter can be applied to each waveguide 106, thereby permitting the phase of each waveguide 106 to be individually tuned. Such configuration would eliminate the need for a tunable laser. Moreover, the response speed of a thermal phase shifter (TPS) is commonly faster than the wavelength sweeping speed of a tunable laser. However, it should be noted that this method also brings two drawbacks: firstly, the total power required to tune every waveguide 106 is usually high; and secondly, to individually control a large number of waveguides 106 typically requires a complicated electronic system.

In some embodiments, once the phase in each waveguide 106 is correctly tuned, the light is ready to be emitted and can be directed to an emitting system 110. In some embodiments, emitting system 110 can be configured as any one of at least three configurations. Firstly, in some embodiments, emitting system 110 can comprise a grating coupler array (GCA), which enables beam steering by phase tuning in one direction and by dispersion in the other direction. This method is adopted in many works—one main limitation in this approach is that the grating coupler usually can only offer a limited steering range within a certain wavelength range.

Secondly, in some embodiments, emitting system 110 can comprise a grating antenna array (AA). This configuration is arranged as an array and offers a similar aperture between the two directions, but usually results in grating lobes due to the relatively large pitch. It is possible to suppress the grating lobes by utilizing an aperiodic arranged array, in, a 2-D aperiodic antenna array designed by a genetic algorithm. However, the aperiodic arrangement is very promising at highlighting the main lobe but is not helpful in terms of energy. The energy that was in grating lobes (in case of no aperiodic arrangement) indeed distributes in the whole 180° range rather than transfer into the main lobe, which appears like normal noise with a slightly higher intensity. However, it is not true "noise," and cannot be further suppressed by apodization, which is a method to handle the real noise.

Thirdly, in some embodiments, emitting system 110 can comprise directly end-coupling the light to free space (EF). The advantage of this method compared to the previous two is the high emitting efficiency, while the difficulty in this method is to create a 2-D converged beam in the case that phase tuning must be done on the surface. It has been found that direct writing method to convert 1-D waveguide array into 2-D can successfully create a 2-D converged beam. However, it can also result in a large pitch that creates grating lobes.

One of the most crucial obstructions between an OPA device and a successful product in the market is the conflict between the phase-tuning system 108 and the emitting system 110. In the phase-tuning system 108, one usually wants to have fewer elements to avoid too complicated electronic hardware; while in the emitting system 110, a large number of waveguides 106 is more desirable to satisfy both large aperture (usually larger than 1 cm) and small pitch (the best is to have a half-wavelength pitch). To overcome this conflict, it may be desirable to attempt to increase the complexity of the electronic hardware or utilize aperiodic arrangement to suppress the grating lobes. Additionally, one may control more emitting elements with fewer phase tuning units. In some embodiments, one may use 2N phase shifters to control $N^2$ emitting elements; however, the concept can only be applied to the antenna array which cannot meet the small pitch requirement and requires a cross waveguide design which usually contains a large insertion loss.

Figure 2:
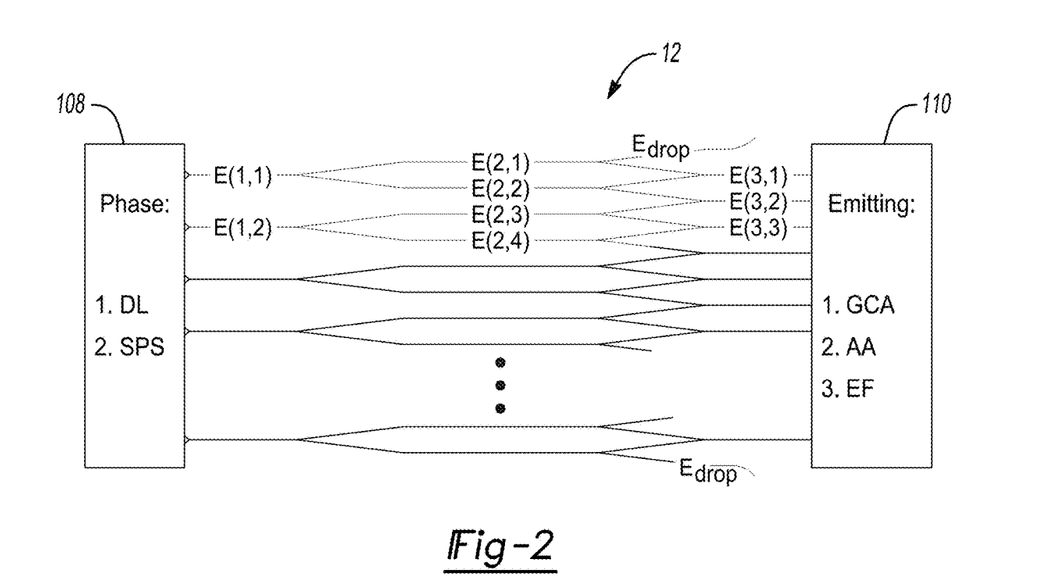
FIG. 2 is an illustration of the PCWD device disposed between the phase-tuning system and the emitting system.

Accordingly, in some embodiments of the present disclosure, as illustrated in FIG. 2, a system is provided that uses N phase tuning units to control 2N−1 emitting elements. When the light comes from the phase-tuning system 108, it is finely tuned so that the phase of the mode in each waveguide 106 follow an expected output—that is, if they directly go to the emitting system 110, they are already able to form a converged beam, but the small number of waveguides 106 decides that it can only satisfy one in between of a large aperture and the small pitch. Hence, the value of our proposed device settles right here.

The structure of the device 10 is as shown in FIG. 2. In some embodiments, the device 10 can comprise a cascaded Y-splitter pair 12 disposed between the phase-tuning system 108 and the emitting system 110. In some embodiments, all of the Y-splitters 12 in the same cascaded level is the same and symmetric, so that the phase change is also the same on the two sides. The waveguide mode right before the first Y-splitter 12 can be noted as E(1, x), so that we have the following equations regardless of the time-variant.

$$E(1,1)=E_m \cdot \exp(\varphi_1)$$

$$E(1,2)=E_m \cdot \exp(\varphi_2)$$

with $\varphi_1$ and $\varphi_2$ to be the tuning result from the phase-tuning system 108. Assume that the insertion phase change of the Y-splitter 12 is $\varphi_{1-2}$ for separating and $\varphi_{2-1}$ for combining. Then we have the waveguide 106 mode at the output end to be as following.

$$E(3, 1) = \frac{1}{2} \cdot [E(2, 1) + E(2, 2)] \cdot \exp(\varphi_{1-2} + \varphi_{2-1}) \quad (1)$$

$$= \frac{1}{2} \cdot E(1, 1) \cdot \exp(2 \cdot \varphi_{1-2} + \varphi_{2-1})$$

$$= \frac{1}{2} \cdot E_m \cdot \exp(\varphi_1 + 2 \cdot \varphi_{1-2} + \varphi_{2-1})$$

and, $$E(3, 2) = \frac{1}{2} \cdot [E(2, 2) + E(2, 3)] \cdot \exp(\varphi_{1-2} + \varphi_{2-1}) \quad (2)$$

$$= \frac{1}{2} \cdot \left[\frac{1}{2} \cdot E(1, 1) + \frac{1}{2} \cdot E(1, 2)\right] \cdot \exp(2 \cdot \varphi_{1-2} + \varphi_{2-1})$$

We can observe from FIG. 2 that the phase change of $\exp(2 \cdot \varphi_{1-2} + \varphi_{2-1})$ exists for every output of the device, if we use $\varphi_{change} = 2 \cdot \varphi_{1-2} + \varphi_{2-1}$, then we can have Eq. 1 and 2 to be as following.

$$E(3, 1) = \frac{1}{2} \cdot E_m \cdot \exp(\varphi_1 + \varphi_{change}) \quad (3)$$

$$E(3, 2) = \frac{1}{2} \cdot E_m \cdot \cos\left(\frac{\varphi_1 - \varphi_2}{2}\right) \cdot \exp\left(\frac{\varphi_1 + \varphi_2}{2} + \varphi_{change}\right) \quad (4)$$

So that, we have every output with odd number work similar to Eq. 3, and every output with even number work similar to Eq. 4. From the equations, we can learn that the mode in every odd number output is the same in phase and a half in amplitude compared to the corresponding input. On the other hand, the even number outputs are the extra part that created by the PCWD 12, their positions are in the center of the two adjacent odd number outputs, and their phase also equals the average of those two adjacent outputs, this perfectly satisfies the phase requirement of OPA. The only imperfection is that there is an intensity difference in every extra output with a different factor of $$\cos\left(\frac{\varphi_{different}}{2}\right).$$

However, when we look into this different factor, we actually can find it doesn't so matter, the reason is as follows: in an OPA based LIDAR, the target detection FOV is a range with a center at 0°, which requires the same phase in each emitting element, so the intensity different factor $$\cos\left(\frac{\varphi_{different}}{2}\right)$$

equals to 1, which means there's no difference. On the other hand, to satisfy the intensity uniformity, it is necessary to abandon the light in the waveguide 106 at the most two sides, which are noted as $E_{drop}$ in FIG. 2. Because of this, there are 2/N of the energy being wasted, where N is the number of inputs, which corresponds to how many individual phase shifters are in the phase-tuning system 108. The most obvious improvement from the greater number of emitting elements is the smaller pitch, it can be observed from FIG. 2, that the waveguide pitch after the PCWD 12 is halved than before the PCWD 12.

From the theoretical analysis, it can be found that the mechanism is based on only phase combining, so that, the PCWD 12 structure has no requirement to the material or specific waveguide size, it works as long as the waveguide 106 is single mode. Considering the crosstalk between waveguides 106, the PCWD 12 can potentially be designed with an output pitch as small as 1.3 µm, or in the range of 1.3 µm to 1.5 µm.

Therefore, with such a structure of PCWD 12, we can use N phase shifters to control 2N−1 emitting elements. It can be expected that a device with this structure will perform perfectly when emitting to normal direction and keep being good in a certain range around 0°, when $\varphi_{different}$ becomes closer to π, the performance of the PCWD 12 device will become worse, but will always be no worse than just using N phase shifters independently.

Finite difference time domain (FDTD) simulation methods have been utilized to investigate the PCWD 12. To get a better understanding of the structure, we simulate three devices: the first device contains the PCWD 12 and 6 input from the phase-tuning system 108, hence it has 11 output to the emitting system 110; second and third devices are for comparison, they have no PCWD 12, one of them contains 11 input and output, the other contains 6.

Two important assumptions were taken in our study: firstly, we assume the phase-tuning system 108 can tune the phase in each waveguide 106 individually with a range of [0, 2π]; secondly, we assume the Y-splitter can be optimized to a nearly adiabatic condition in the real experiment. These two assumptions are realistic according to the previous studies. So that, the splitter and phase-tuning system 108 were not included in the simulation, the phase tuning is done by directly change the phase parameter of the light source 102. After the PCWD 12, the light is end-fired to the free space (RIX=1) to obtain the far field. The waveguide 106 material is set to be $Si_3N_4$ within $SiO_2$ environment, as this is consistent with the experiment. Sinusoidal pulse with a wavelength of 1550 nm and TE-polarization are utilized as light sources for each waveguide 106, all the other parameters are set to be the same in the simulation of the three devices. The pitch at the input part is set to be 8 µm (for 6 input, also see FIG. 5A, and at the output part is set to be 4 µm (for 11 output, also see FIG. 5A, so that all the three devices have the same emitting aperture of 40 µm. The reason we select such a large pitch is to get a good comparison between grating lobes (see the explanation of FIG. 3), once the principle is proved, it can be easily applied to a smaller pitch.

Figure 3:
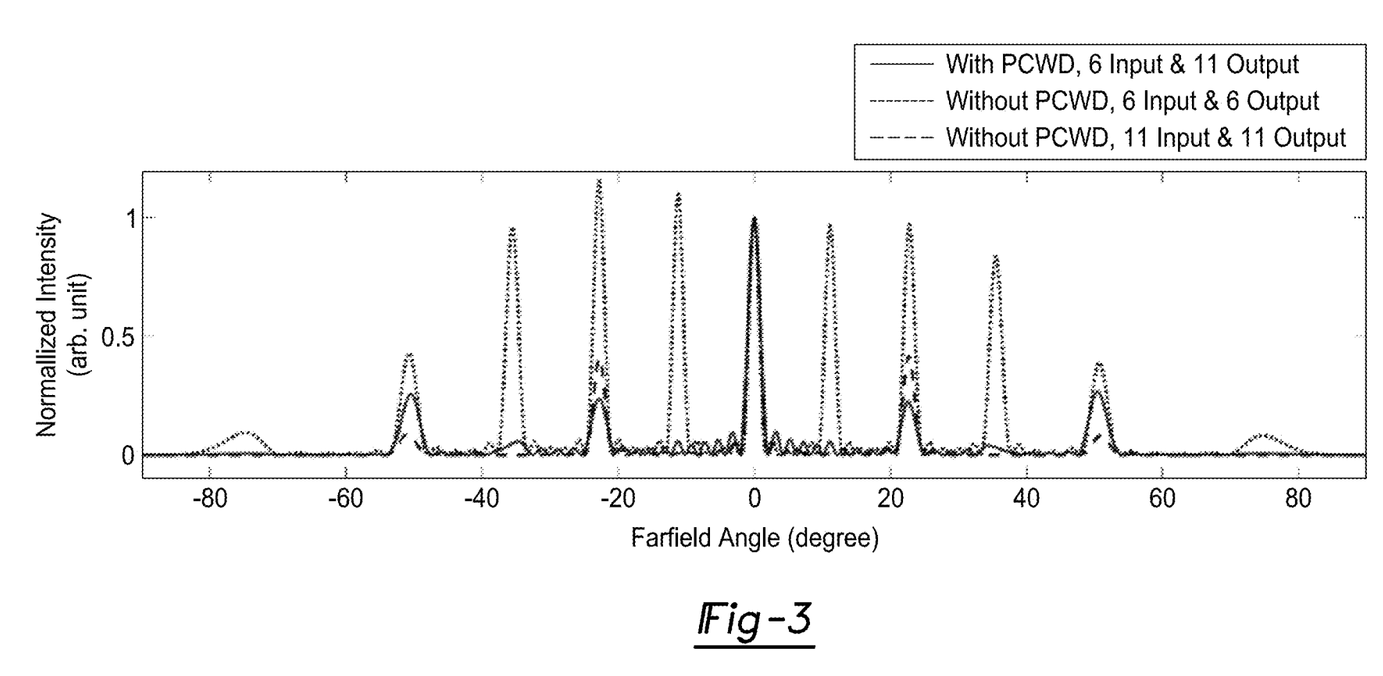
FIG. 3 is a simulation result for three devices with main lobe at 0°. The intensity is normalized according to the main lobe (0°).

FIG. 3 shows the simulation result for the three devices when $\varphi_{different}$ is set to be zero, that is when the main lobe is at 0°. In the figure, the black dot line is for the device without PCWD 12 and contains 6 input & output. It can be seen, because there're only 6 elements to cover 40 μm, the pitch is 8 μm, so that there are many grating lobes, there are 4 distinguishable grating lobes at both the positive and negative direction, the closest two to the main lobe are at ±11.15°. The blue dash line is for the device without PCWD 12 and contains 11 input & output, the emitting pitch is 4 μm, so that closest grating lobes are at ±22.81°, corresponds to the second closest grating lobes in the black curve, meanwhile, the intensity is much smaller than the black curve. The red line is for the proposed device with PCWD 12, contains 6 input and 11 output, the result shows clearly that the closest grating lobes are at −22.73° and 22.72° this result agrees with the theoretical analysis, that a device with PCWD 12 can work well in the normal direction, comparable to a no PCWD 12 device with 2N−1 phase shifters.

Figure 4A:
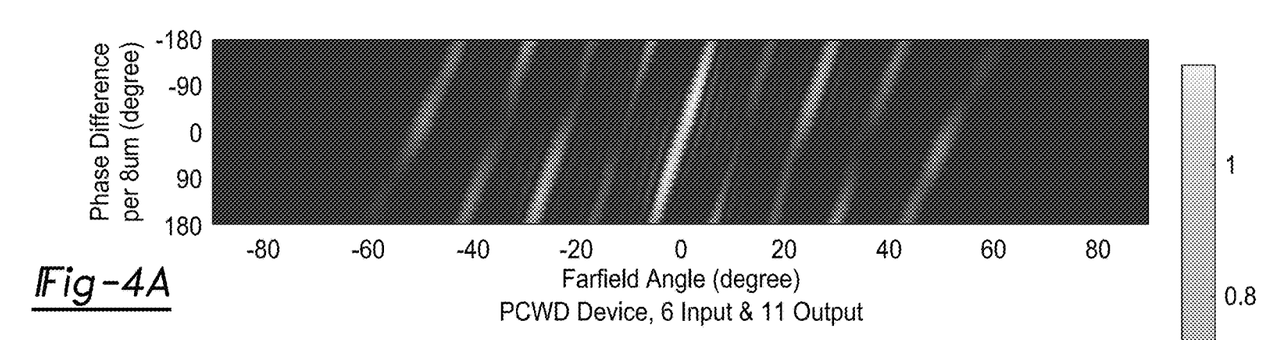
Figure 4B:
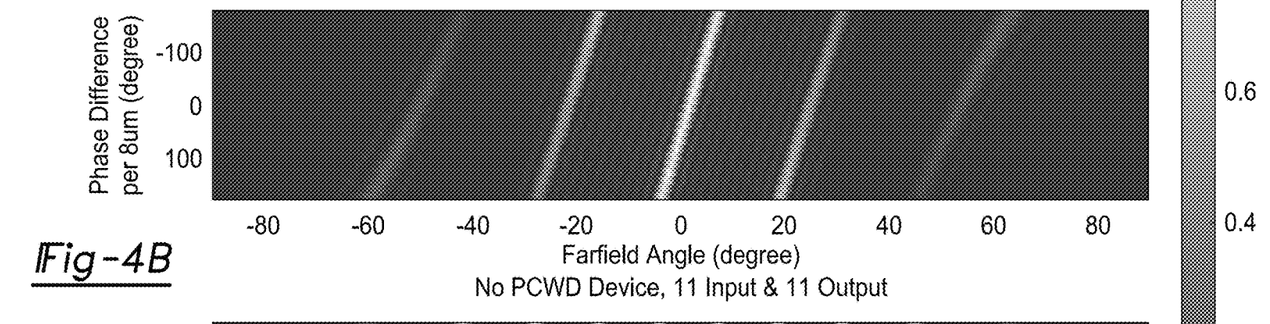
Figure 4C:
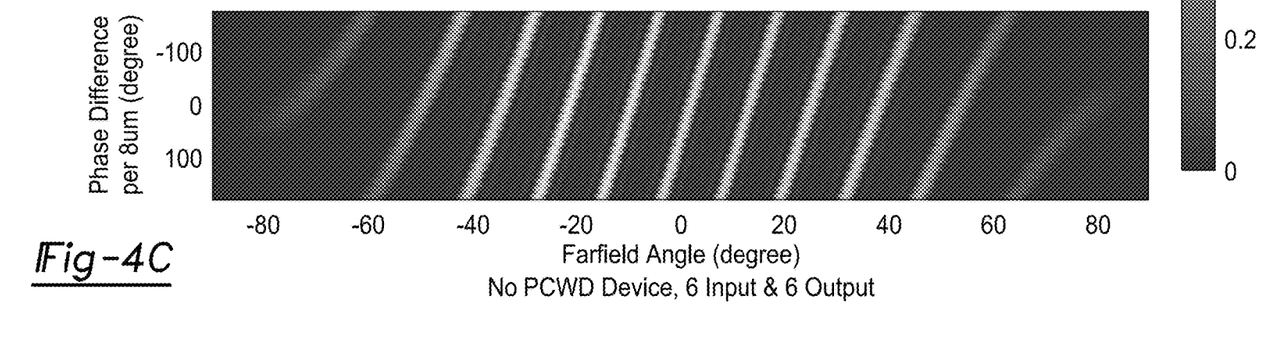

FIGS. 4A-4C show the simulation result for three devices with $\varphi_{different}$ range of [−180°, 180°], note here the data were normalized in the same way as in FIG. 3. It can be seen that with the change of $\varphi_{different}$, the angle of every lobe in all the three devices shift uniformly, the three main lobes both shift with a steering angle of 5.3° which agrees with the (phase change)/(distance) value, it is worth to note that this value can be easily increased by using a smaller pitch as discussed in part II. FIG. 4A is for the PCWD 12 device, it can be observed that its performance is in between FIGS. 4B and 4C, which agrees with the theoretical analysis, that the PCWD 12 device will perform closer to FIG. 4B when $\varphi_{different}$ is close to 0, and performs closer to FIG. 4C when $\varphi_{different}$ is close to π.

We have fabricated a sample for the proof-of-concept. It is worth to note that the principle of this PCWD 12 structure works for any phase tuning method, and it's more valuable when single phase shifter is used, as the function of PCWD 12 is to allow using fewer phase shifters to control more emitting elements. However, due to the limitation of our experiment platform, we select wavelength tuning mechanism as it can fully eliminate the need for an electronic part, which significantly reduces the experiment complexity. We fabricated two devices, both use single light source, 1×16 splitter tree, and an Ω shape delay line region with delay length difference of 10 μm between each waveguide 106, the pitch between each waveguide 106 is set to be 8 μm, consistent with the simulation parameter. After the delay line region, one device contains the PCWD 12 structure to double the waveguide 106 number from 16 to 31, so that the PCWD 12 device has an emitting pitch of 4 μm, whereas the other device doesn't contain the PCWD 12, it still has an 8 μm emitting pitch.

Figure 5A:
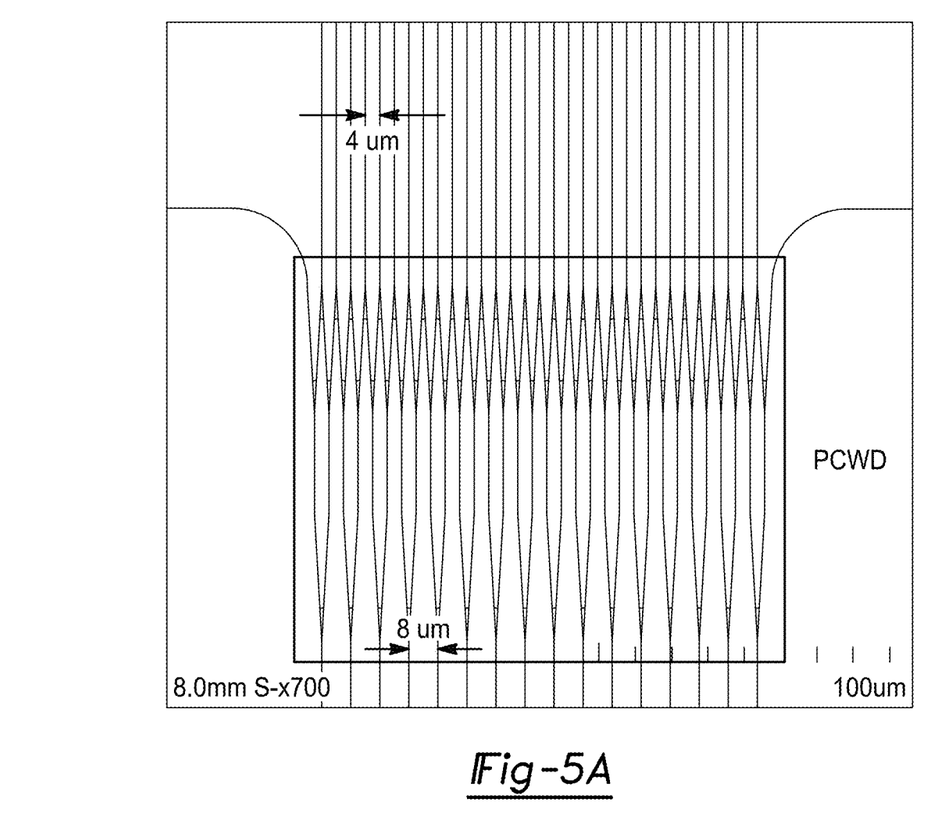
FIG. 5A shows an SEM picture of the PCWD structure before cladding and FIG. 5B shows an optical path in the measurement setup.

The fabrication is done in the Lurie Nanofabrication Facility at Ann Arbor, Mich. The sample is based on a Si wafer, first, the substrate $SiO_2$ and the waveguide 106 $Si_3N_4$ layers are deposited using LPCVD, this is to obtain a better layer uniformity so that to reduce the waveguide 106 loss. Then the $Si_3N_4$ is patterned using optical lithography, following by a cladding $SiO_2$ layer deposition using PECVD. The thickness of the substrate and cladding $SiO_2$ layers are set to be 2 μm to eliminate potential leakage to the bottom Si wafer or the air, and the $Si_3N_4$ waveguide 106 is set to be 600 nm thick and 650 nm wide, note that the size of the waveguide 106 doesn't have to be accurate as there's indeed no requirement of it. The last step is to dice the sample and polish the sidewall so that the light can end-fire to the free space from $Si_3N_4$ waveguides 106. FIG. 5 a is the SEM picture of the PCWD 12 device before cladding, the structure is in the yellow block, the cascaded Y-splitter can be viewed, there are 16 waveguides 106 before the PCWD 12 with a pitch of 8 μm and 31 waveguides 106 after it with a pitch of 4 μm.

Figure 5B:
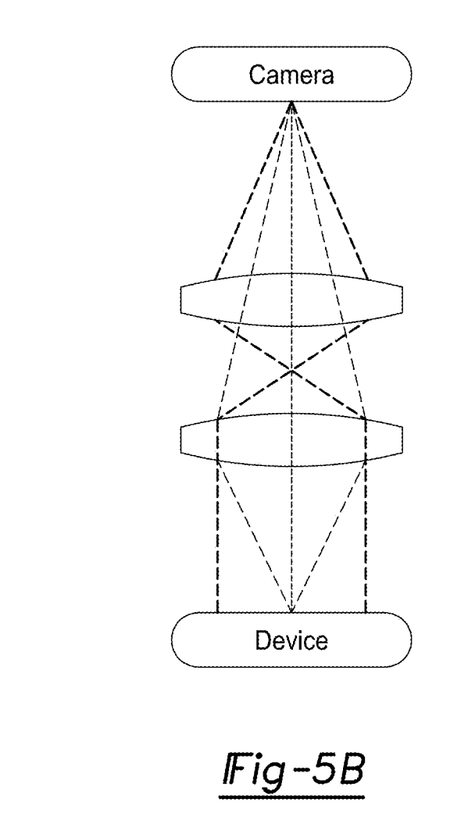

For the measurement setup, the light is offered by a tunable laser (TLX1, Thorlabs) followed by a fiber polarization controller (FPC030, Thorlabs), a flat cleaved fiber end is used to butt-couple the light into the sample. At the emitting system 110, one bi-convex lens is used for the near field (blue dash line in FIG. 5B, and two lenses are used together to create the Fourier optics plane for the far field measurement (orange dash line in FIG. 5B.

Figure 6A:
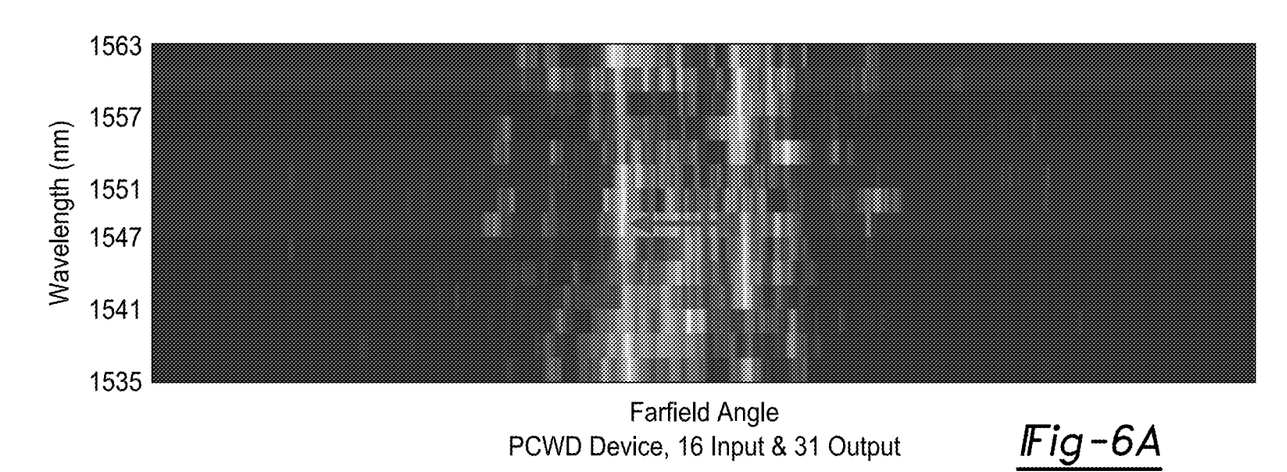
FIGS. 6A-B show an experiment result where a PCWD device, two lobes can be clearly distinguished with a relatively large distance (see FIG. 6A), and where no PCWD device, two lobes are very clear and more than two lobes can be roughly distinguished (see FIG. 6B), the distance between lobes being relatively small.
Figure 6B:
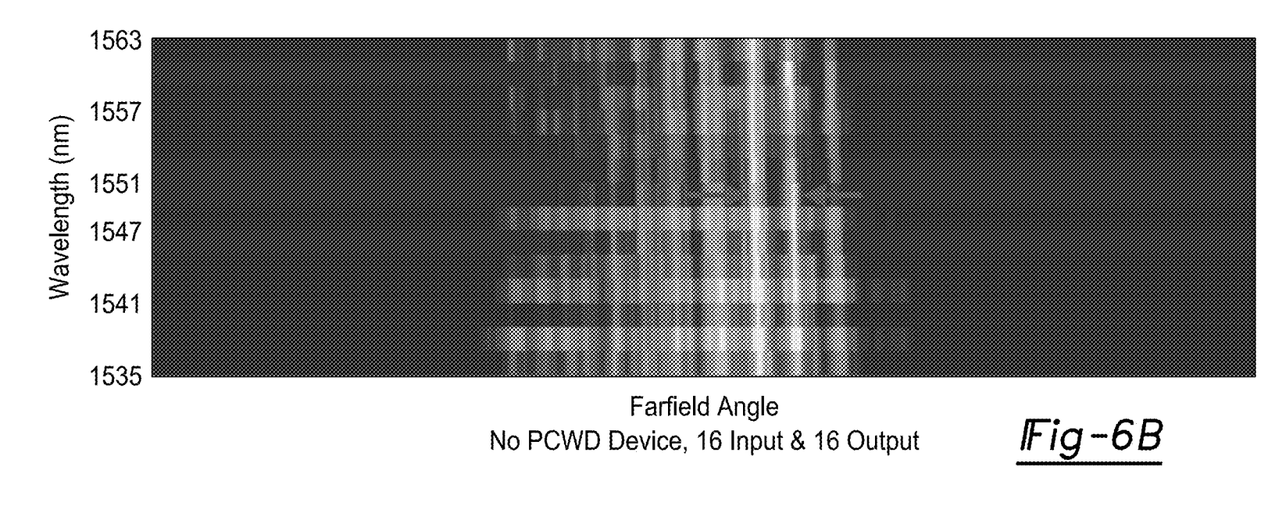

Because there's only one layer of waveguide 106 with the end-fire emitting, the emitted beam is indeed a fan beam, which converges horizontally but diverges vertically. The far field measurement results are shown in FIGS. 6A-B, in this figure, only the cross-section of the far field at the normal plane in the vertical direction is collected. FIG. 6A is the result for the device with PCWD 12, it can be seen that there are two clear lobes, they both shift to the left with the increased wavelength. On the other hand, FIG. 6B is for the device without PCWD 12, there are also two clear lobes, and some other lobes can be roughly distinguished from the figure, all the clear or unclear lobes shift to the left with increased wavelength.

Upon review of FIGS. 6A and 6B, we can see that the lobe distance for (a) is larger than (b) (arrowed in FIGS. 6A-B). Particularly, the distance indicated by the arrow in FIG. 6A is about twice the distance indicated by the arrows in FIG. 6B. This agrees with the theoretical analysis and the simulation result, that in most case, the PCWD 12 device can effectively reduce the emitting pitch to half so that double the distance between lobes. Accordingly, the experimental results support the conclusion that the PCWD 12 structure provides the benefits states herein.

Secondly, from the simulation result, we can know how many degrees that the lobe distance should be for the two devices: they should be 11.15° (for 4 μm) and 22.73° (for 8 μm). With such a reference, we can read out the steering angle from the result. The two lobes for the PCWD 12 device in FIG. 6A steers 1.58° in the wavelength range of 1535 nm to 1563 nm; the two clear lobes for the no PCWD 12 device in FIG. 6B steers 2.07°. This difference is possibly due to the slight waveguide 106 thickness variation as they are at two different positions on the wafer. It is worth to note that this device utilized the wavelength tuning method, so in principle, the steering angle can be easily increased by either using a smaller pitch or using a larger delay length.

In this work, we have proposed a phase combining waveguide 106 doubler (PCWD 12) to enable the control of 2N−1 emitting elements using N phase shifters. We emphasize the value of this structure, analyze the mechanism in theory, numerically investigated and experimentally demonstrated the concept of the device; the result is promising for a proof-of-concept. This structure can satisfy any phase tuning method and most of the emitting method, in the meantime, this structure has no requirement on material or any detailed structure size, it is compatible with nearly every OPA based beam steering device The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. An optical phased array system comprising:
    a phase tuning system receiving light energy and output light energy;
    an emitting system; and
    a phase-combining waveguide doubler having a cascaded Y-splitter pair disposed between the phase tuning system and the emitting system, the phase-combining waveguide doubler receiving the light energy output from the phase tuning system and directing same via the Y-splitter pair to double an output of light energy to the emitting system, each of the Y-splitter being in a same cascaded level and symmetric such that a phase change of the light energy is the same on opposing sides thereof.

2. The optical phased array system according to claim 1 wherein the phase-combining waveguide doubler is single mode.

3. The optical phased array system according to claim 1 wherein an output pitch of the phase-combining waveguide doubler is in the range of 1.3 μm to 1.5 μm.

* * * * *